United States Patent
Kairali et al.

(10) Patent No.: US 12,463,944 B2
(45) Date of Patent: Nov. 4, 2025

(54) DATA CONFIDENTIALITY BASED SECURE ROUTE MAPS AND TRAVEL PLANS FOR EDGES BASED ON MINIMAL SCC AGENT

(71) Applicant: INTERNATIONAL BUSINESS MACHINES CORPORATION, Armonk, NY (US)

(72) Inventors: Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 726 days.

(21) Appl. No.: 17/654,250

(22) Filed: Mar. 10, 2022

(65) Prior Publication Data
US 2023/0291717 A1   Sep. 14, 2023

(51) Int. Cl.
H04L 9/40 (2022.01)

(52) U.S. Cl.
CPC .................. *H04L 63/04* (2013.01)

(58) Field of Classification Search
CPC ......... H04L 63/04; H04L 45/04; H04L 45/08; H04L 45/44; G01C 21/3461; G01C 21/3492; B60W 40/02
See application file for complete search history.

(56) References Cited

U.S. PATENT DOCUMENTS

| | | | |
|---|---|---|---|
| 1,175,664 A * | 3/1916 | Shute | D01B 1/04 19/60 |
| RE41,546 E | 8/2010 | Vainstein | |
| 8,583,365 B2 * | 11/2013 | Jang | G01C 21/3476 340/995.14 |
| 9,927,252 B1 | 3/2018 | Chokshi | |
| 9,998,926 B1 | 6/2018 | Gale | |
| 11,092,452 B2 * | 8/2021 | Jones | B60W 60/0015 |
| 11,175,664 B1 * | 11/2021 | Boyraz | G05D 1/0278 |
| 11,276,316 B1 * | 3/2022 | Hayward | G08G 1/0141 |
| 12,055,399 B2 * | 8/2024 | Konrardy | G05D 1/617 |
| 2006/0247852 A1 | 11/2006 | Kortge | |
| 2009/0048771 A1 | 2/2009 | Speier | |
| 2014/0149322 A1 | 5/2014 | Lavoie | |
| 2018/0003514 A1 * | 1/2018 | Kim | A63B 24/0075 |

OTHER PUBLICATIONS

Boldonjames, "Automated Data Classification," BoldonJames.com, [accessed Oct. 6, 2021], 5 pgs., Retrieved from the Internet: <https://www.boldonjames.com/data-classification/automated-classification/>.

Mell et al., "The NIST Definition of Cloud Computing", National Institute of Standards and Technology, Special Publication 800-145, Sep. 2011, pp. 1-7.

(Continued)

*Primary Examiner* — Hosuk Song
(74) *Attorney, Agent, or Firm* — Elliot J. Shine

(57) ABSTRACT

A method, computer system, and a computer program product for data confidentiality is provided. The present invention may include detecting a confidentiality level of data within a source edge. The present invention may include identifying a required safety level of a route of travel based on the detected confidentiality level. The present invention may include selecting the route of travel based on the required safety level and the detected confidentiality level.

20 Claims, 7 Drawing Sheets

(56) References Cited

OTHER PUBLICATIONS

Mora-Gimeo, et al., "A Secure Multi-Tier Mobile Edge Computing Model for Data Processing Offloading Based on Degree of Trust," Sensors 2018 MDPI, Sep. 23, 2018, 19 pgs.

Nagaratnam, "What Is Confidential Computing," IBM, Oct. 16, 2020, 8 pgs.

Sotnikov, "Data Classification: What It Is and How to Implement It," [accessed Oct. 6, 2021], 25 pgs., Retrieved from the Internet: <https://blog.netwrix.com/2020/09/02/data-classification/>.

Trinh, et al., "Energy-Aware Mobile Edge Computing and Routing for Low-Latency Visual Data Processing," IEEE Transactions on Multimedia, vol. 20, No. 10, Oct. 2018, 16 pgs.

\* cited by examiner

DATA CONFIDENTIALITY BASED SECURE ROUTE MAPS AND TRAVEL PLANS FOR EDGES BASED ON MINIMAL SCC AGENT

BACKGROUND

The present invention relates generally to the field of computing, and more particularly to edge computing.

Edge computing may extend cloud computing and the Internet of Things (IoT) to an edge of the network (e.g., an entry point to the network, and an area where a device or local network interfaces with the Internet). Edge computing may move computational power and resources closer to end users by increasing a number of endpoints and locating the endpoints nearer to consumers (e.g., users and/or devices). Edge computing architectures may be built on existing technologies and/or established paradigms for distributed systems. Thus, an edge computing architecture may be comprised of many well-known components (e.g., which may be used to create effective architectures to build and deliver edge use cases). During edge computing, a number of far edge devices may be required to collaborate with one another to perform a computation.

SUMMARY

Embodiments of the present invention disclose a method, computer system, and a computer program product for data confidentiality. The present invention may include detecting a confidentiality level of data within a source edge. The present invention may include identifying a required safety level of a route of travel based on the detected confidentiality level. The present invention may include selecting the route of travel based on the required safety level and the detected confidentiality level.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
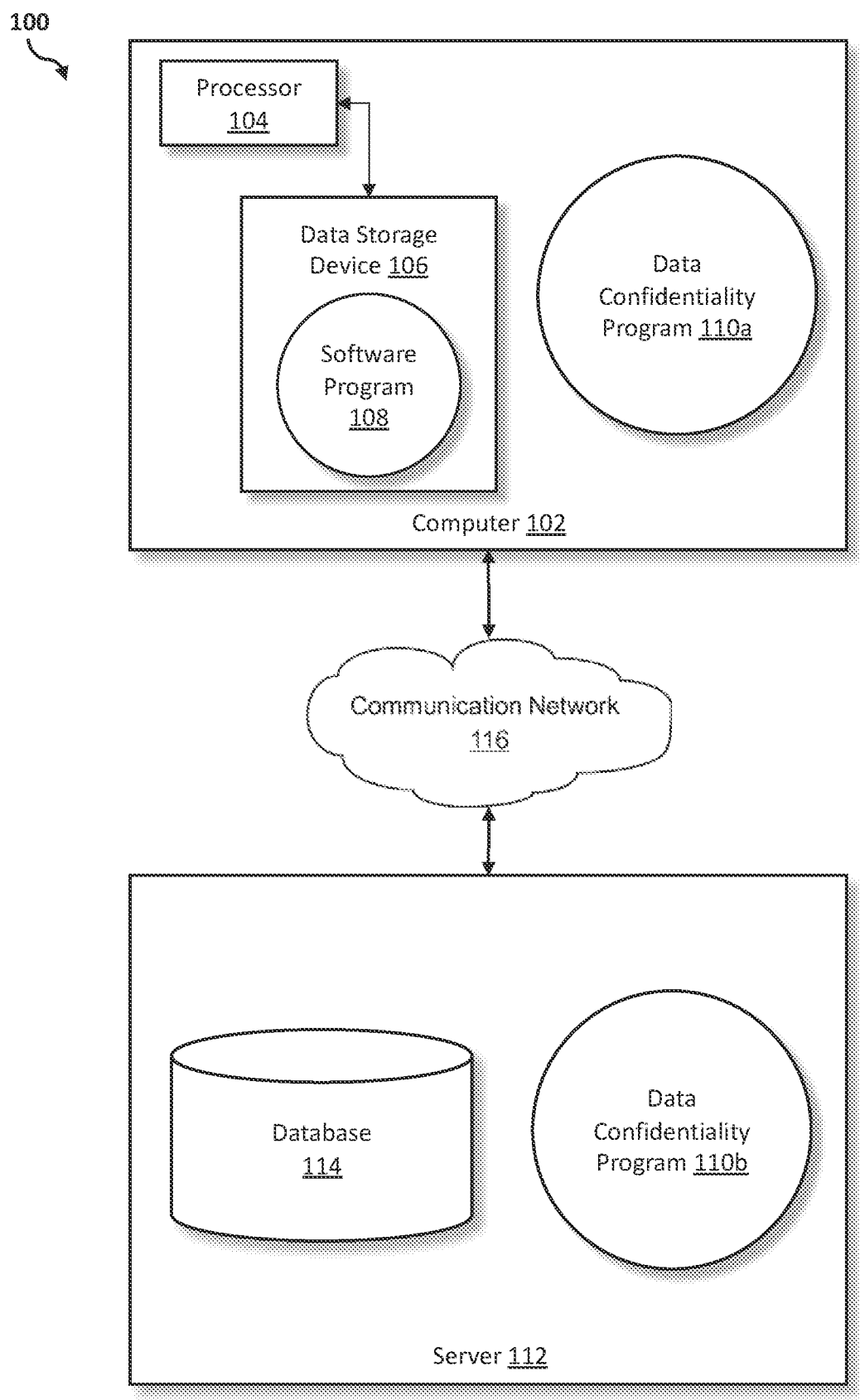
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for data confidentiality. As such, the present embodiment has the capacity to improve the technical field of edge computing by providing a way to detect a confidentiality level of data at an edge of an edge computing environment and to select a safe route along which confidential data or data which may need to be secured or securely transferred to a cloud or target may travel. The present environment further has the capacity to improve the technical field of edge computing by providing a way to dynamically adjust a route map of edges in the edge computing environment, based on the detected confidentiality level. More specifically, the present invention may include detecting a confidentiality level of data within a source edge. The present invention may include identifying a required safety level of a route of travel based on the detected confidentiality level. The present invention may include selecting the route of travel based on the required safety level and the detected confidentiality level.

As described previously, edge computing may extend cloud computing and the Internet of Things (IoT) to an edge of the network (e.g., an entry point to the network, and an area where a device or local network interfaces with the Internet). Edge computing may move computational power and resources closer to end users by increasing a number of endpoints and locating the endpoints nearer to consumers (e.g., users and/or devices). Edge computing architectures may be built on existing technologies and/or established paradigms for distributed systems. Thus, an edge computing architecture may be comprised of many well-known components (e.g., which may be used to create effective architectures to build and deliver edge use cases). During edge computing, a number of far edge devices may be required to collaborate with one another to perform a computation.

In an edge computing architecture, for example, storage and/or computing resources which may be utilized in performing a computation may be essentially moved towards a location where the data is generated. This may essentially place computational resources at the same point as the data source at the network edge.

However, as the network edges handle data processing, confidential data may be generated and/or captured. For example, an edge which is analyzing a camera feed and/or closed-circuit television feed directed at detecting incidents, now may have incident details (e.g., which may, in certain circumstances, include forensic evidence).

Therefore, it may be advantageous to, among other things, enable edges which may have confidential data which needs to be secured, to secure such data or to securely transfer such data to a cloud or target. This may include enabling the edge to select a safe route along which the data may travel and/or to dynamically adjust a route of data travel based on detecting a data confidentiality level.

According to at least one embodiment, the present invention may be implemented by extending a traditional cloud centric edge computing architecture. The present invention may identify near edges and far edges of an edge computing architecture (i.e., infrastructure) based on the edge gateways' network capabilities and may enable the edges to download a Security and Compliance Center (SCC) agent to the edge which may detect a confidentiality level of data located at the edge.

According to at least one embodiment, a centralized SCC (e.g., of the cloud data center) may be used to detect a confidentiality level of data located at an edge (e.g., in instances where sufficient network coverage exists at the edge). In other cases, for example, where there are sufficient processing capabilities at an edge but less network coverage due to a mobility pattern at the edge, the SCC agent of the edge may preprocess information relating to the data located at the edge and only required data may be sent to the centralized SCC. The centralized SCC or the SCC of the edge (based on where the analysis is done) may detect a confidentiality level following the details articulated with respect to step 202 below.

According to at least one embodiment, the present invention may utilize a mapping of confidentiality levels to security levels required in travel routes of data in the edge computing environment. The SCC may determine whether a potential route is secure enough based on the data confidentiality to security level mapping. Once a travel route is determined, the travel route may be sent from an SCC agent to an edge (e.g., a mobile edge). When a heightened confidentiality level is detected or when an edge on a route no longer contains confidential data, the SCC may dynamically change (e.g., adjust, readjust) the travel route.

According to at least one embodiment, a centralized SCC may keep track of historical changes in confidentiality levels of each participating edge. If it is determined that a particular edge depicts a recurring pattern of producing or acquiring confidential data, then the centralized SCC may pre-adjust routes of data travel accordingly.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a data confidentiality program 110a. The networked computer environment 100 may also include a server 112 that is enabled to run a data confidentiality program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the data confidentiality program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the data confidentiality program 110a, 110b (respectively) to detect a confidentiality level of data at an edge of an edge computing environment, to select a safe route along which data may travel, or to dynamically adjust a route map of edges in the edge computing environment, based on the detected confidentiality level. The data confidentiality method is explained in more detail below with respect to FIGS. 2 through 4.

Figure 2:
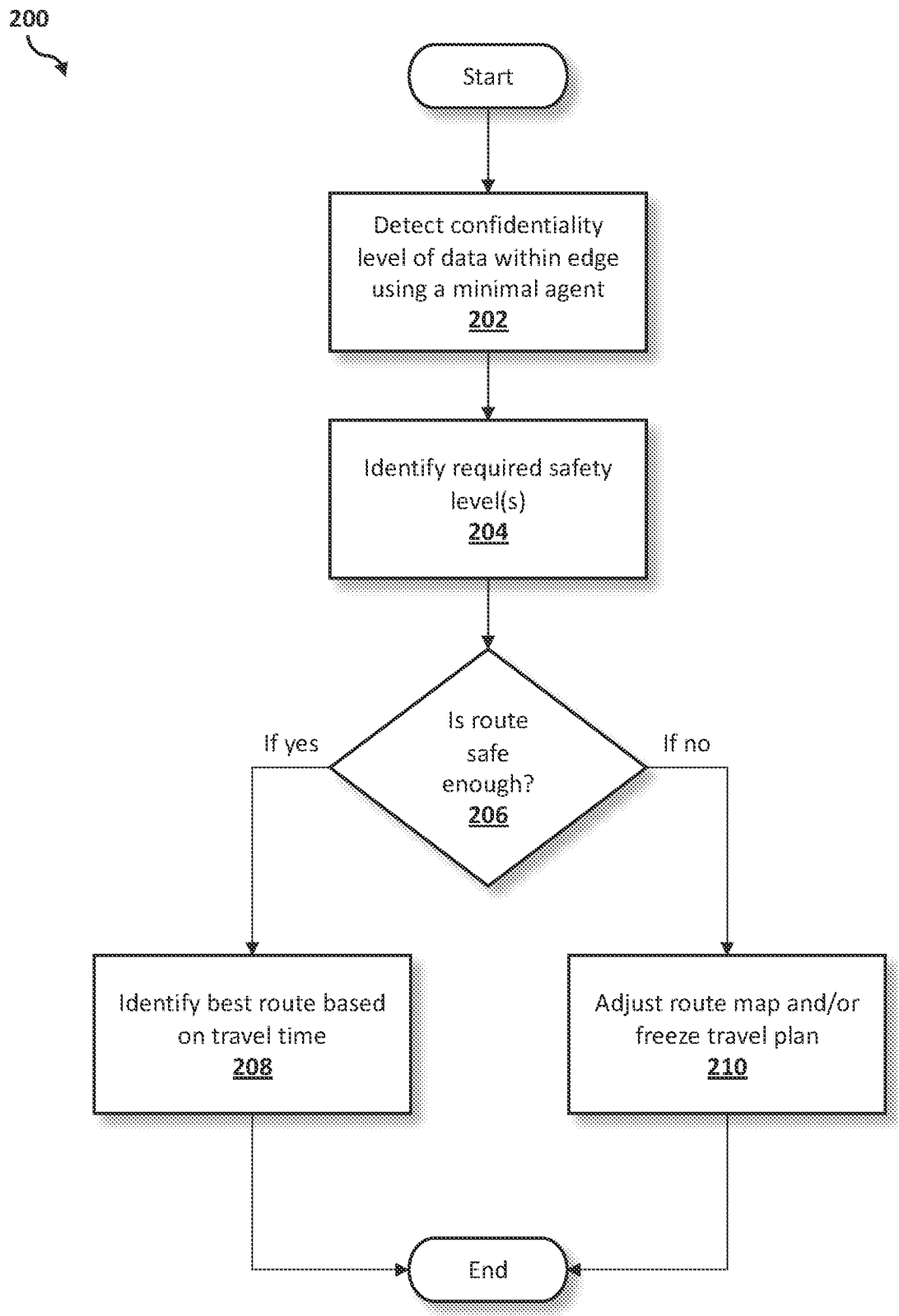
FIG. 2 is an operational flowchart illustrating a process for data confidentiality according to at least one embodiment.

Referring now to FIG. 2, an operational flowchart illustrating the exemplary data confidentiality process 200 used by the data confidentiality program 110a and 110b according to at least one embodiment is depicted.

At 202, a confidentiality level of data within an edge is detected using a minimal agent of a Security and Compliance Center (SCC). An SCC may be a centralized hub which governs cloud resource configurations and centrally manages a compliance to organization and regulatory guidelines. The SCC may do this by collecting data from various targets which may include edges. The SCC may install an agent (i.e., a minimal agent) or a collector which may collect compliance and security data from a target. The collected data may then be sent to the SCC and the SCC may interpret and enable the visualization of the collected data in a centralized dashboard. An agent or collector may collect data based on policies and/or goal information the agent or collector may have received in regular intervals from the SCC.

The data confidentiality program 110a, 110b may utilize a mapping between safety levels required for a given data confidentiality level. The mapping may be a user provided mapping to the cloud, which may exist in a centralized location such as the SCC and may change depending on who implements the system. The system may provide a default set of mappings depending upon implementation (e.g., there may be a default set of mapping requirements and additional information may be provided by a user depending on the implementation of the system).

The data confidentiality program 110a, 110b may be enabled to detect various data confidentiality levels and an administrator of the program may be able to choose a required safety level for each data confidentiality level. The mapping utilized by the data confidentiality program 110a, 110b may be present in the Security and Compliance Center (SCC) of a cloud in which each edge is connected to. This may mean that a required safety level may be different at different edges within the cloud, even for the same data, if the mapping at the different edges is different. Each mapping may be configured in the SCC and sent to the agent or collector at the edge.

The data confidentiality program 110a, 110b may detect a confidentiality of data within each edge of an edge computing environment using a minimal agent of the SCC by continuously scanning data being generated and detecting the confidentiality levels of the generated data. The minimal agent of the SCC may detect the confidentiality of data at each edge, for example, by automatically classifying data using a pre-defined rule set (e.g., which may be based on matching keywords and/or expressions in the data with a predefined list of keywords and/or expressions). Another example of how the confidentiality of data at each edge may be detected by the minimal agent of the SCC is by utilizing an established data classification policy which defines a purpose of the data classification and further defines a plurality of data sensitivity levels. In this second example, once the data classification policy is established, confidential data at an edge may be identified and labeled by tagging the data based on the defined data sensitivity levels. As a third example, the minimal agent of the SCC may detect the confidentiality of data at each edge using a custom implementation where an administrator of the edge computing environment maps a confidentiality score for each data type within the SCC and the SCC may download this information.

Existing methods of detecting data confidentiality may include classifying data as restricted (e.g., a classification which may require the highest level of security and compliance controls that the system can offer). Restricted data may include data protected by state or federal privacy regulations and data protected by confidentiality agreements, such as any data which violates health or privacy laws. Existing methods of detecting data confidentiality may also include classifying data as private in instances when the unauthorized disclosure, alteration or destruction of data may result in a moderate level of risk to a user and/or a customer of the system. By default, all institutional data that may not be explicitly classified as restricted data or public data should be treated as private data. An example of private data may be unpublished marks of students at a university. Lastly, public data may be any data which is not classified as restricted or private. Data classification may be done by searching through the data to identify a level of confidentiality.

At 204, required safety level(s) are detected. Once the confidentiality level of data within an edge is detected using the minimal agent of the SCC, details of the confidentiality level may be sent to the SCC and the SCC may detect the required safety levels. The required safety levels may be associated with, for example, default goals of the SCC. The required safety levels may be considered rules for a level confidentiality. The data confidentiality program 110a, 110b may analyze the route plan of the edge and may detect whether the route is safe enough based on the detected confidentiality level. As will be discussed in more detail below with respect to step 210, if a route of travel of the data should be changed based on the detected confidentiality level, the data confidentiality program 110a, 110b may enable this route adjustment.

For example, with respect to the restricted data referenced above, required safety levels of "ENCRYPTION AT REST" and "ENCRYPTION IN TRANSIT" may be given.

At 206, it is determined whether a predicted route is safe enough, based on the detected confidentiality level of the data within the edge. A route may be determined to be safe enough based on the established data classification policy. A route may further be determined to be safe enough based on data from the centralized SCC (wherein the centralized SCC is an SCC of the cloud, and a collector or agent is installed on an edge of the cloud) which keeps track of historical changes in confidentiality levels of each participating edge.

If the centralized SCC determines that a particular edge depicts a recurring pattern of producing or acquiring confidential data, then the centralized SCC may pre-adjust routes of data travel accordingly and may maintain a repository of routes determined to be safe enough for confidential data to travel.

In determining whether a predicted route is safe enough, the data confidentiality program 110a, 110b may identify a speed and a direction of far edge devices and may further identify how many far edge devices may be available to participate in edge computing.

In some instances, a source edge may have highly confidential data and there may be no secure route to a destination edge. The SCC may issue a warning to the source edge and the destination edge and may suspend travel from the source edge to the destination edge until it is either determined that the confidential data may be delivered securely and/or until an alternate edge may be able to acquire the confidential data from the source edge to safely deliver the confidential data.

If, at 206, it is determined that the predicted route is safe enough for the data to travel, then at 208 a best route is identified based on travel time. Travel time may be a travel time of the edge (e.g., measured in an average velocity based on factors including network traffic and other related aspects). In some instances, the edge of the edge computing environment may upload processed data to the cloud and may no longer possess confidential data locally (e.g., a lowered confidentiality as compared to a confidentiality level detected with respect to step 202 above). In these instances, the SCC agent may modify the route map and select a new route which may be determined to be best based on a centralized mapping of the edge computing environment as well as an efficiency of the route map. At this point, the focus of the data confidentiality program's 110a, 110b analysis may be on travel time of the data from the edge to a destination, and not exclusively on securely transferring data at the source edge determined to have a heightened confidentiality.

In some instances, the SCC may be enabled to predict a time window (e.g., an hour of the day or a day of the week) in which the confidential data may arrive at a destination edge. This may be made possible by the SCC keeping track of confidential data arrivals. For example, every hour of a day, the SCC may mark whether confidential data was presented in that hour. This may be done for each hour of the day, for 7 days of a week, and for 52 weeks in year. During a learning period, the system may build a historical database based on this data. For example, if during this learning period the system determines that in the 11th hour of 99% of Tuesdays over the course of a year, confidential data was received, then the system may mark the 11th hour of Tuesdays as a confidentiality window. The system may have implemented a threshold here (which may be user configurable and modifiable) to permit the rule to be made even when confidential data was not detected in 100% of the Tuesdays.

Even if the destination edge does not currently possess any confidential data, before setting the route map, the data confidentiality program 110a, 110b may determine whether any predicted secure window of travel is expected to be at the destination edge within the travel time expected by the data coming from the source edge. If yes, then the route map may be adjusted in such a way that any additional travel time required due to the adjustment may be less than a potential delay experienced when the destination edge is being utilized for secure travel.

If, at 206, it is determined that the predicted route is not safe enough for the data to travel, then at 210 a route map is adjusted and/or a travel plan is frozen. The adjustment may be based, in essence, on a self-recommendation that the system has based on detected data confidentiality, as described above. A route may be dependent on other factors (e.g., disaster predictions, among other things), however the adjustment here may be based on the data collected herein and the predicted route may also be based on a dynamic confidentiality of data.

In some instances, there may not be a secure route from a source edge to a destination edge based on the data located at the source edge. In such instances, the SCC may propose that the edge freeze a data travel plan until another edge which can access a potential secure route can acquire the data from the source edge. This may be referred to as an emergency travel freeze.

Figure 3:
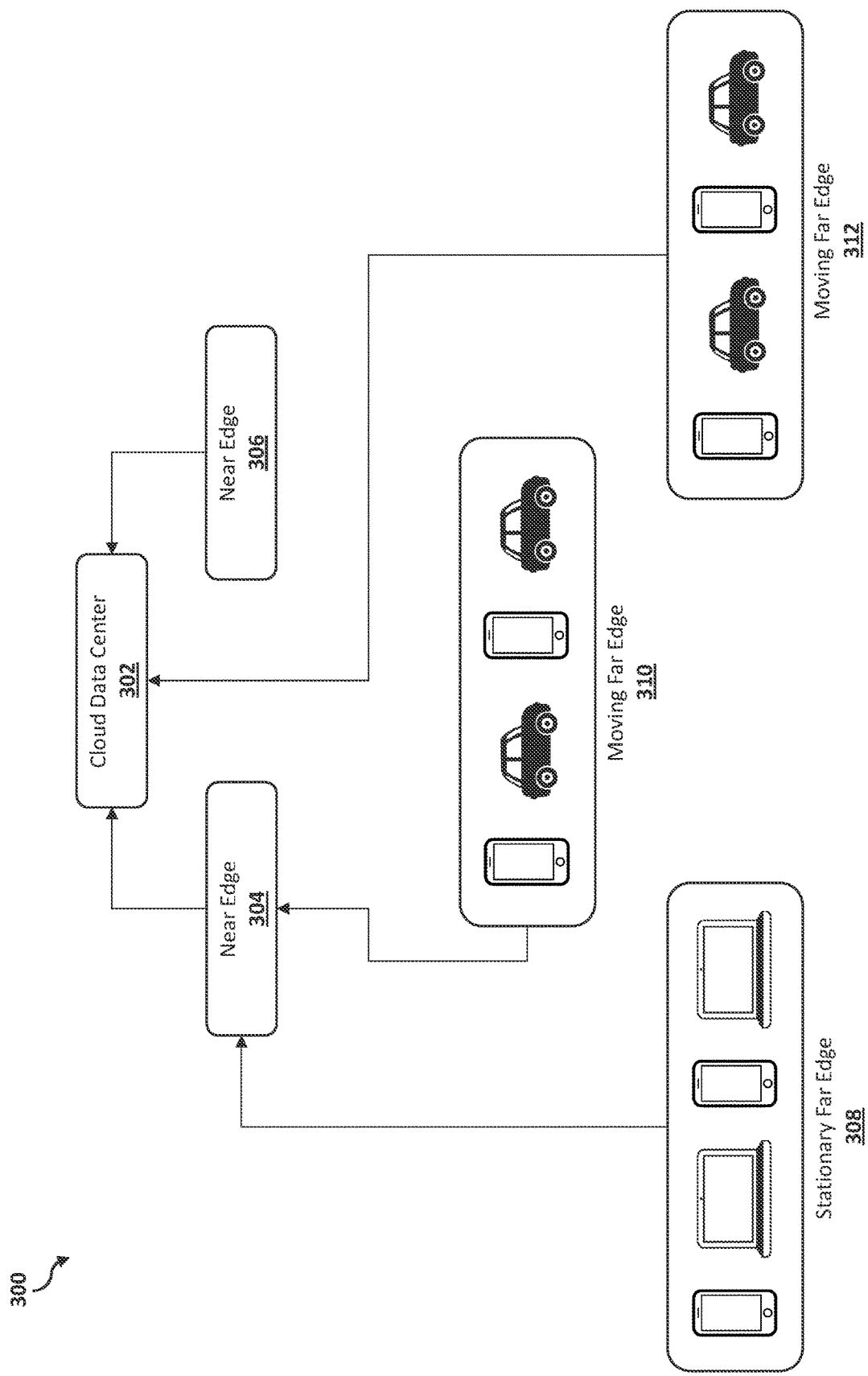
FIG. 3 is a block diagram of an edge computing environment according to at least one embodiment.

Referring now to FIG. 3, a block diagram 300 of an edge computing environment according to at least one embodiment is depicted. Edge computing may be a form of computing which may be performed on site (e.g., near an origination of data) or near a particular data source. This may minimize the need for data processing in a remote data center (e.g., cloud data center 302). The cloud data center 302 may be this exemplary embodiment of an edge computing environment's remote data center. The near edge 304 and near edge 306 may be the edge computing infrastructure which may be deployed in a location between a far edge (e.g., stationary far edge 308, moving far edge 310, and moving far edge 312). The near edge 304 and near edge 306 may host generic data services while the far edges (e.g., those deployed at locations farthest from the cloud data center 302 and closest to the users, including stationary far edge 308, moving far edge 310, and moving far edge 312) may require lower latency, higher scalability, and/or high throughput, among other things.

Figure 4:
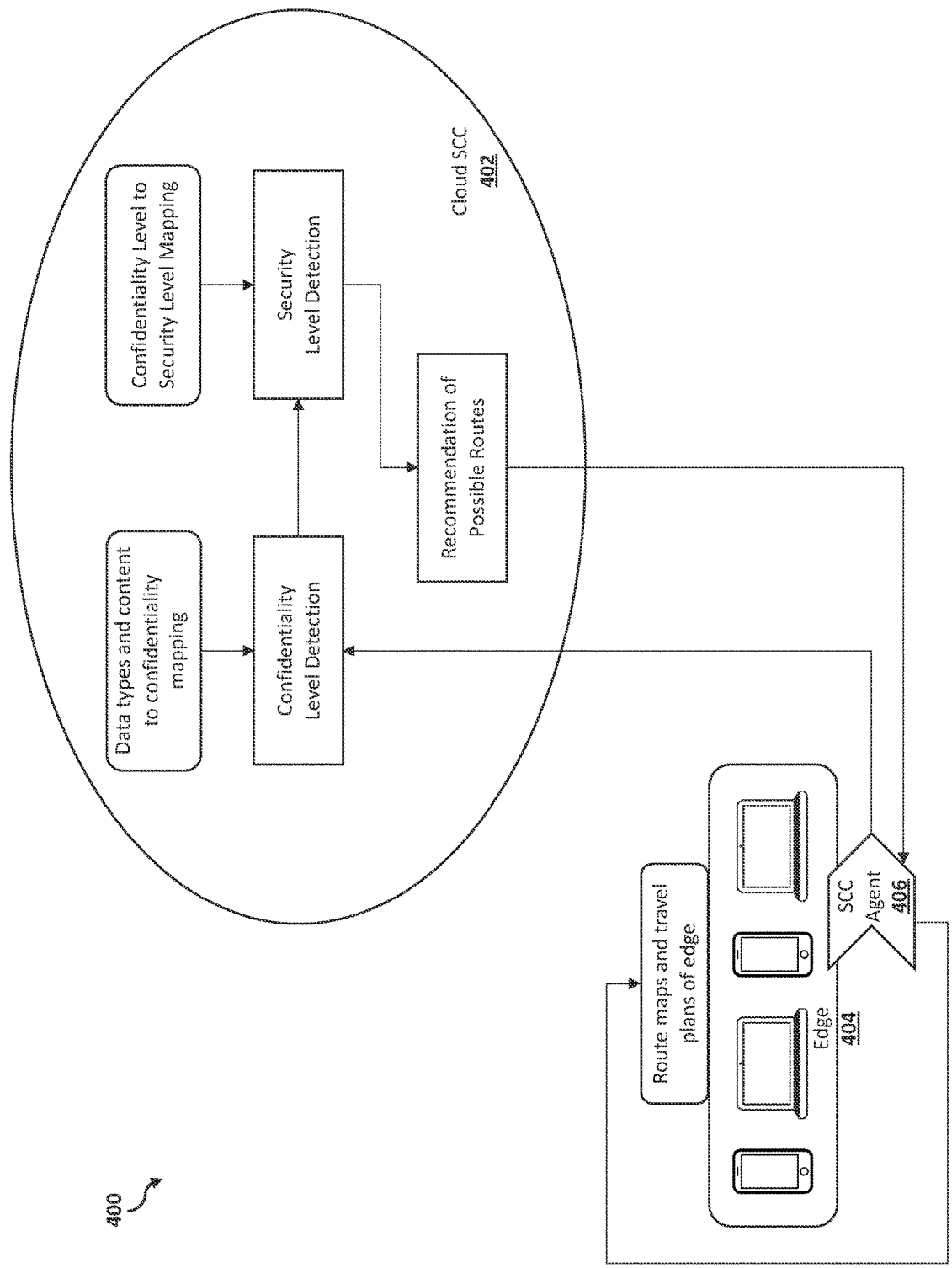
FIG. 4 is an exemplary embodiment of the data confidentiality program according to at least one embodiment.

Referring now to FIG. 4, an exemplary embodiment 400 of the data confidentiality program 110*a*, 110*b* according to at least one embodiment is depicted. The exemplary embodiment 400 depicts a Cloud SCC 402, an Edge 404, and an SCC Agent 406, among other things. The Cloud SCC 402 of the data confidentiality program 110*a*, 110*b* may detect a confidentiality level and hence a security level required for the travel of data from the Edge 404. In order to detect the confidentiality level and the security level, the data confidentiality program 110*a*, 110*b* may rely on a mapping of data types and content confidentiality and a mapping of confidentiality level to security level, respectively. The detection of confidentiality level and ultimately security level may result in a recommendation of possible routes for the data to travel from the Edge 404 (e.g., including any route change and/or travel freeze as described previously with respect to FIG. 2 above). The recommendation may be provided to the SCC Agent 406 which may in turn provide the information to the Edge 404.

It may be appreciated that FIGS. 2 through 4 provide only an illustration of one embodiment and do not imply any limitations with regard to how different embodiments may be implemented. Many modifications to the depicted embodiment(s) may be made based on design and implementation requirements.

Figure 5:
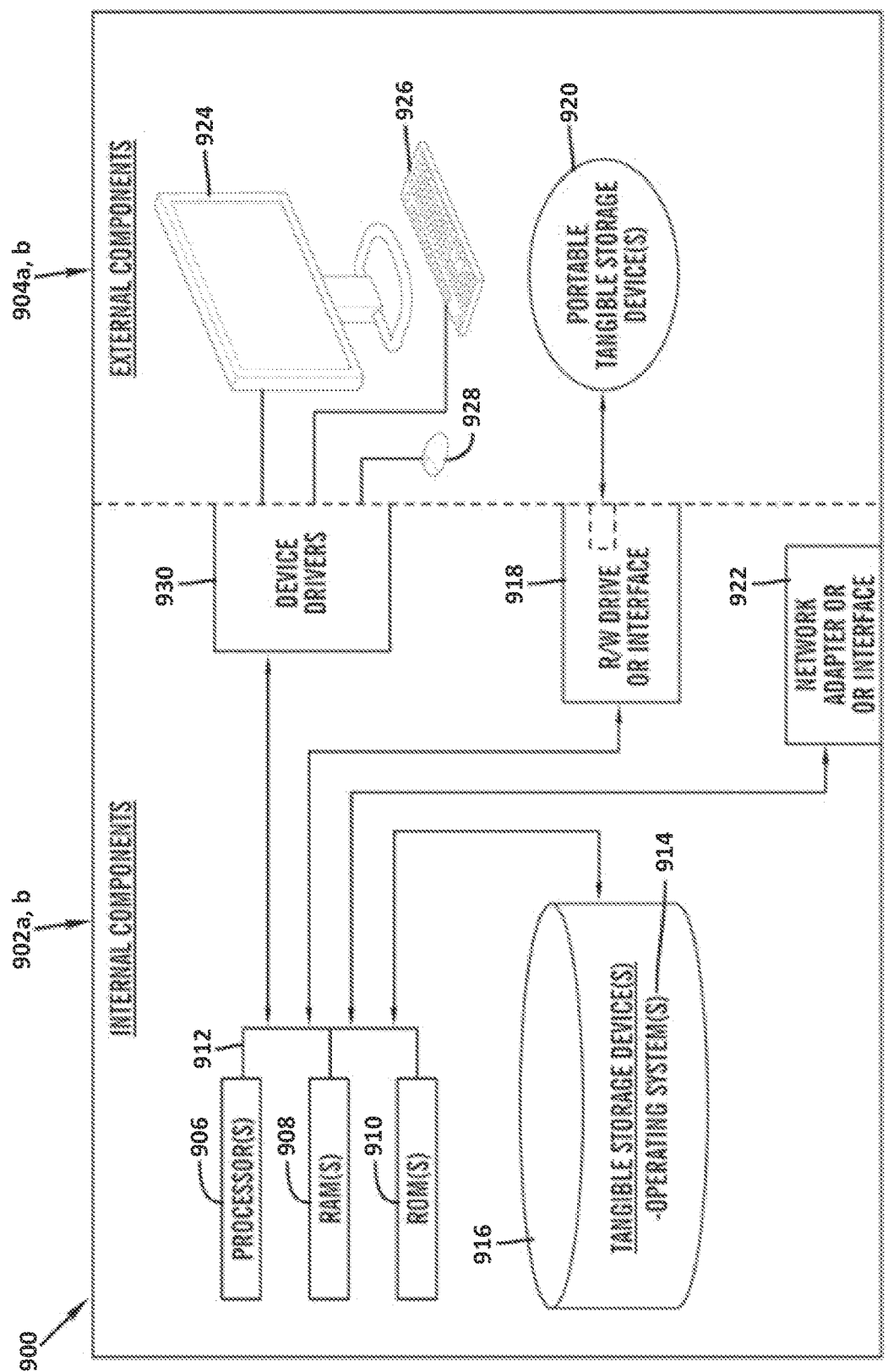
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902*a, b* and external components 904*a, b* illustrated in FIG. 5. Each of the sets of internal components 902*a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the data confidentiality program 110*a* in client computer 102, and the data confidentiality program 110*b* in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902*a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the data confidentiality program 110*a* and 110*b* can be stored on one or more of the respective portable computer-readable tangible storage devices 920, read via the respective RAY drive or interface 918 and loaded into the respective hard drive 916.

Each set of internal components 902*a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the data confidentiality program 110*a* in client computer 102 and the data confidentiality program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the data confidentiality program 110*a* in client computer 102 and the data confidentiality program 110*b* in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is to be understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
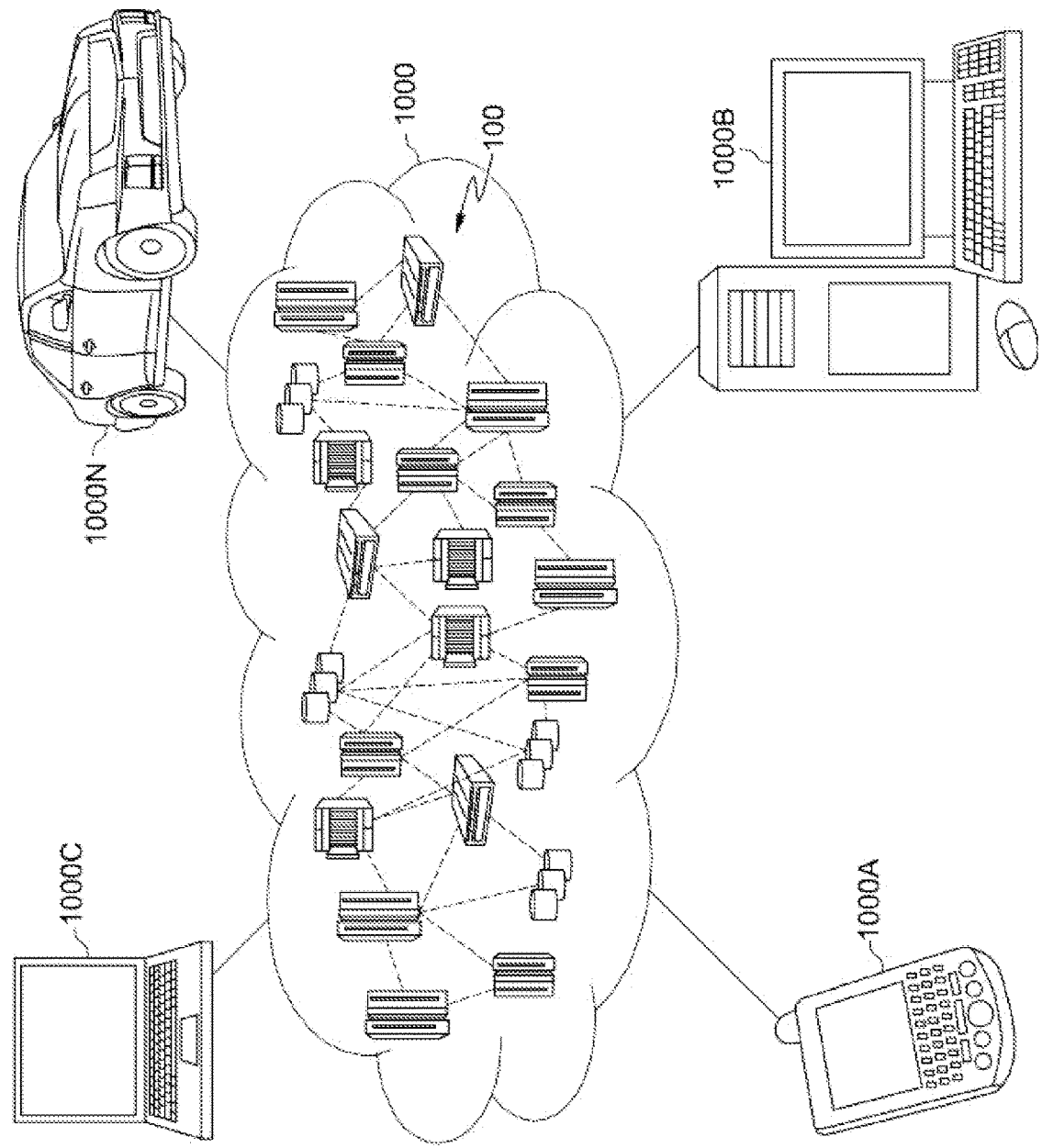
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
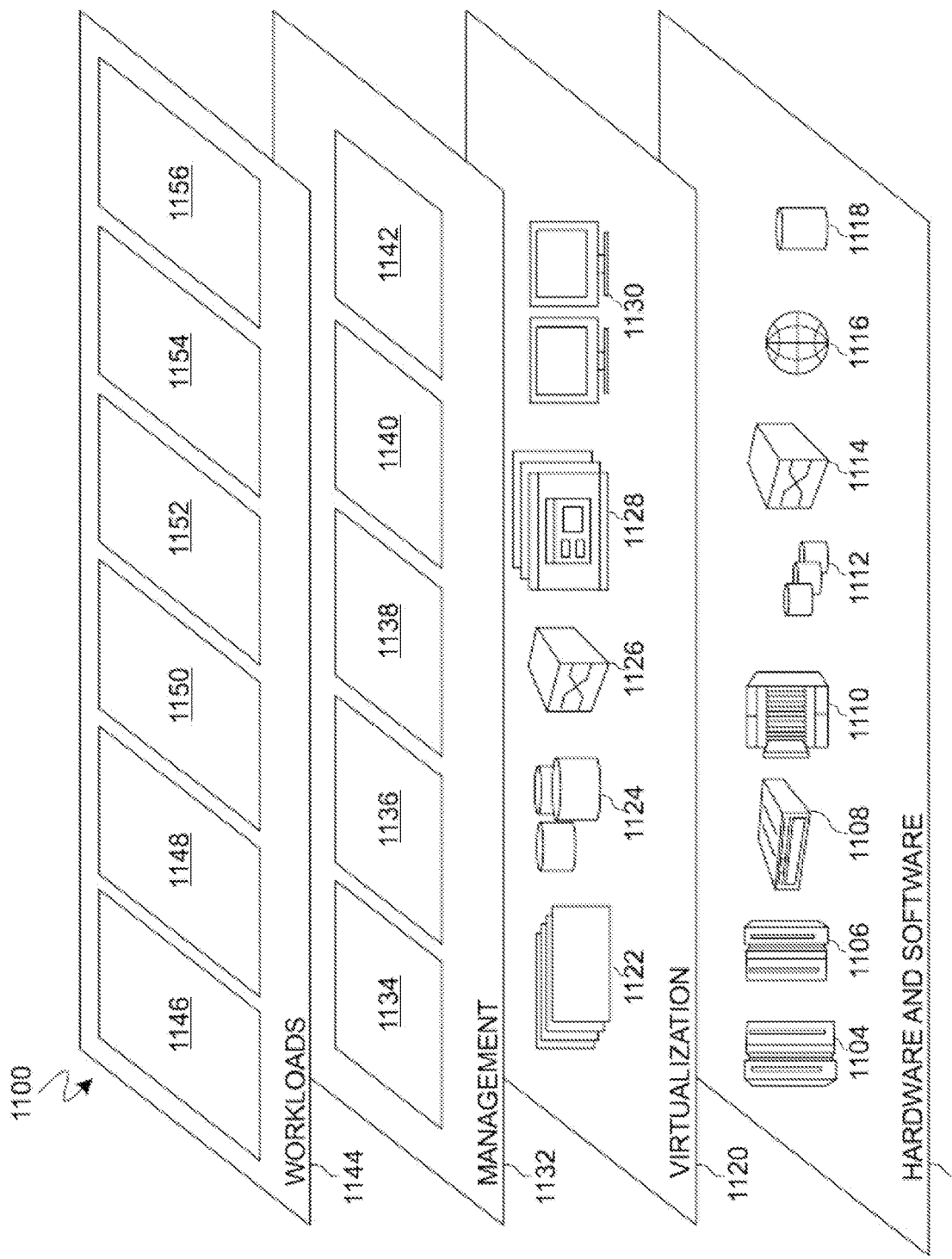
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and data confidentiality 1156. A data confidentiality program 110a, 110b provides a way to detect a confidentiality level of data at an edge of an edge computing environment and to select a safe route along which confidential data or data which may need to be secured or securely transferred to a cloud or target may travel. The data confidentiality program 110a, 110b further provides a way to dynamically adjust a route map of edges in the edge computing environment, based on the detected confidentiality level.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data confidentiality, the method comprising:
    detecting a confidentiality level of data within a source edge using a minimal agent of a Security and Compliance Center (SCC), wherein the minimal agent sends details of the confidentiality level of data within the source edge to the SCC;
    identifying, by the SCC, a required safety level of a route of travel based on the detected confidentiality level; and
    selecting, by the SCC, the route of travel based on the required safety level and the detected confidentiality level.

2. The method of claim 1, wherein detecting the confidentiality level of data within the source edge further comprises:
    utilizing a predefined mapping which maps the confidentiality level to a safety level, wherein the predefined mapping is located in the SCC of a cloud which the source edge is connected to.

3. The method of claim 1, wherein identifying the required safety level of the route of travel based on the detected confidentiality level further comprises:
    analyzing a route plan;
    determining that an edge on the route plan depicts a recurring pattern of producing or acquiring confidential data; and
    adjusting the route plan to avoid the edge.

4. The method of claim 1, wherein identifying the required safety level of the route of travel based on the detected confidentiality level further comprises:
    identifying a speed and a direction of at least one far edge device; and
    identifying a number of far edge devices which are available to participate in an edge computation.

5. The method of claim 1, wherein identifying the required safety level of the route of travel based on the detected confidentiality level further comprises:
    issuing a warning to the source edge and a destination edge advising of the detected confidentiality level; and
    suspending any travel between the source edge and the destination edge until it is determined that the data within the source edge can be delivered securely from the source edge to the destination edge.

6. The method of claim 1, wherein selecting the route of travel based on the required safety level and the detected confidentiality level further comprises:
    determining that the route of travel is safe based on identifying a secure time window in which to travel.

7. The method of claim 1, wherein the minimal agent of the SCC utilizes an established data classification policy in the detecting of the confidentiality level of the data within the source edge, wherein the established data classification policy defines a purpose of the data classification and a plurality of data sensitivity levels.

8. A computer system for data confidentiality, comprising:
    one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
  detecting a confidentiality level of data within a source edge using a minimal agent of a Security and Compliance Center (SCC), wherein the minimal agent sends details of the confidentiality level of data within the source edge to the SCC;
  identifying, by the SCC, a required safety level of a route of travel based on the detected confidentiality level; and
  selecting, by the SCC, the route of travel based on the required safety level and the detected confidentiality level.

9. The computer system of claim 8, wherein detecting the confidentiality level of data within the source edge further comprises:
  utilizing a predefined mapping which maps the confidentiality level to a safety level, wherein the predefined mapping is located in the SCC of a cloud which the source edge is connected to.

10. The computer system of claim 8, wherein identifying the required safety level of the route of travel based on the detected confidentiality level further comprises:
  analyzing a route plan;
  determining that an edge on the route plan depicts a recurring pattern of producing or acquiring confidential data; and
  adjusting the route plan to avoid the edge.

11. The computer system of claim 8, wherein identifying the required safety level of the route of travel based on the detected confidentiality level further comprises:
  identifying a speed and a direction of at least one far edge device; and
  identifying a number of far edge devices which are available to participate in an edge computation.

12. The computer system of claim 8, wherein identifying the required safety level of the route of travel based on the detected confidentiality level further comprises:
  issuing a warning to the source edge and a destination edge advising of the detected confidentiality level; and
  suspending any travel between the source edge and the destination edge until it is determined that the data within the source edge can be delivered securely from the source edge to the destination edge.

13. The computer system of claim 8, wherein selecting the route of travel based on the required safety level and the detected confidentiality level further comprises:
  determining that the route of travel is safe based on identifying a secure time window in which to travel.

14. The computer system of claim 8, wherein the minimal agent of the SCC utilizes an established data classification policy in the detecting of the confidentiality level of the data within the source edge, wherein the established data classification policy defines a purpose of the data classification and a plurality of data sensitivity levels.

15. A computer program product for data confidentiality, comprising:
  one or more non-transitory computer-readable storage media and program instructions stored on at least one of the one or more tangible storage media, the program instructions executable by a processor to cause the processor to perform a method comprising:
  detecting a confidentiality level of data within a source edge using a minimal agent of a Security and Compliance Center (SCC), wherein the minimal agent sends details of the confidentiality level of data within the source edge to the SCC;
  identifying, by the SCC, a required safety level of a route of travel based on the detected confidentiality level; and
  selecting, by the SCC, the route of travel based on the required safety level and the detected confidentiality level.

16. The computer program product of claim 15, wherein detecting the confidentiality level of data within the source edge further comprises:
  utilizing a predefined mapping which maps the confidentiality level to a safety level, wherein the predefined mapping is located in the SCC of a cloud which the source edge is connected to.

17. The computer program product of claim 15, wherein identifying the required safety level of the route of travel based on the detected confidentiality level further comprises:
  analyzing a route plan;
  determining that an edge on the route plan depicts a recurring pattern of producing or acquiring confidential data; and
  adjusting the route plan to avoid the edge.

18. The computer program product of claim 15, wherein identifying the required safety level of the route of travel based on the detected confidentiality level further comprises:
  identifying a speed and a direction of at least one far edge device; and
  identifying a number of far edge devices which are available to participate in an edge computation.

19. The computer program product of claim 15, wherein identifying the required safety level of the route of travel based on the detected confidentiality level further comprises:
  issuing a warning to the source edge and a destination edge advising of the detected confidentiality level; and
  suspending any travel between the source edge and the destination edge until it is determined that the data within the source edge can be delivered securely from the source edge to the destination edge.

20. The computer program product of claim 15, wherein the minimal agent of the SCC utilizes an established data classification policy in the detecting of the confidentiality level of the data within the source edge, wherein the established data classification policy defines a purpose of the data classification and a plurality of data sensitivity levels.

* * * * *